(12) United States Patent
Barber

(10) Patent No.: US 8,145,762 B2
(45) Date of Patent: Mar. 27, 2012

(54) COLLECTING INFORMATION REGARDING CONSUMER CLICK-THROUGH TRAFFIC

(75) Inventor: Timothy P. Barber, Boise, ID (US)

(73) Assignee: Kount Inc., Boise, ID (US)

( * ) Notice: Subject to any disclaimer, the term of this patent is extended or adjusted under 35 U.S.C. 154(b) by 374 days.

(21) Appl. No.: 12/125,677

(22) Filed: May 22, 2008

(65) Prior Publication Data

US 2008/0294711 A1   Nov. 27, 2008

Related U.S. Application Data

(60) Provisional application No. 60/931,395, filed on May 22, 2007.

(51) Int. Cl.
*G06F 15/173* (2006.01)
*G06Q 20/00* (2006.01)

(52) U.S. Cl. .............. 709/226; 709/224; 705/14.19

(58) Field of Classification Search ............ 709/226; 707/5
See application file for complete search history.

(56) References Cited

U.S. PATENT DOCUMENTS

| | | | | |
|---|---|---|---|---|
| 2004/0098229 A1* | 5/2004 | Error et al. | ............. | 702/186 |
| 2004/0153365 A1* | 8/2004 | Schneider et al. | ............ | 705/14 |
| 2006/0282327 A1* | 12/2006 | Neal et al. | ............ | 705/14 |
| 2007/0255821 A1* | 11/2007 | Ge et al. | ............ | 709/224 |
| 2007/0260518 A1* | 11/2007 | Ronen et al. | ............ | 705/14 |
| 2008/0034211 A1* | 2/2008 | Shull et al. | ............ | 713/175 |
| 2008/0040653 A1* | 2/2008 | Levine | ............ | 715/205 |

* cited by examiner

*Primary Examiner* — Djenane M Bayard
*Assistant Examiner* — Joiya Cloud
(74) *Attorney, Agent, or Firm* — Fenwick & West LLP

(57) ABSTRACT

A method and system for providing the centralized collection of click-through traffic information. The method includes receiving a DNS query for a domain name at a third party auditing service from a requesting computing resource. The domain name is configured to include click-through information as a subdomain, and wherein a URL associated with the domain name provides content. The click-through information is parsed from the domain name without establishing a connection between said third party auditing server and any web server providing the content. An IP address for the web server associated with the domain name is sent to the requesting computing resource.

27 Claims, 4 Drawing Sheets

COLLECTING INFORMATION REGARDING CONSUMER CLICK-THROUGH TRAFFIC

CROSS REFERENCE TO RELATED APPLICATIONS

The present application claims priority to and the benefit of Provisional Application No. 60/931,395 to Timothy P. Barber, entitled "System and Method for Centrally Collecting Real-Time Information Regarding Consumer Clickthrough Traffic," filed on May 22, 2007, which is herein incorporated by reference in its entirety.

BACKGROUND OF THE INVENTION

1. Field of the Invention

The present invention is generally directed to the transfer of information over a communication network. Specifically, the present invention relates to the collection of information related to consumer click-through traffic through the use of an authoritative domain name server.

2. The Relevant Technology

The internet creates new ways to transfer information between users throughout the world. Ever evolving services as implemented through the internet provide for the communication of information for business, education, work, private, and social purposes. As a result, these services attract increasing numbers of users to the internet year after year.

More particularly, advertising through the internet is an effective way to promote products and services directly to targeted consumers. Different methods have been created for presenting advertising over the internet and the corresponding payments by the advertisers for displaying the advertising.

For example, pay-per-click (PPC) advertising allows for web sites, as a publisher, to display advertising that include links that when actuated brings a consumer directly to the advertiser's web site. These advertisements may be managed by the owner of the web site, by an advertising network (e.g., search engine) that is used by a consumer to access the web site, or by a combination of both.

In another example, a search engine directly displays advertising or sponsored links during the course of a consumer's search request. In this case, when a consumer enters a search query, a list of web site results is returned. In addition, advertising in the form of sponsored links to various websites are also provided that can be targeted to the consumer based on the search terms used in the query.

In each of these cases, the advertiser will pay to those who manage the advertising a fee whenever a consumer clicks on the advertising. For instance, the advertiser may pay a fee to the owner of the web site upon which the advertising is displayed, the search engine used to access the web site, or a combination of both. More specifically, a search engine is capable of tracking the click-through activity by consumers for a particular advertisement. As such, the search engine can produce reports that provide various search click-through statistics, as well as a billing activity related to the click-through statistics. Based on the report, the advertiser will pay a certain fee for tracked and valid click-throughs.

However, click fraud may distort the actual number of valid click-throughs for a particular advertisement. Click fraud may be implemented by a number of parties, to include the web site owner that hosts the advertising itself clicking on the advertisement for collection of more fees, a competitor of the advertiser for purposes of making the advertiser increase or reach prematurely their advertising budget by paying for irrelevant clicks, etc.

In response, publishers of advertising and search engines have implemented various filters to identify the number of fraudulent click-throughs. As such, the advertiser need not pay for invalid click-throughs. However, these filtering techniques typically are guarded by the implementing search engine, and are not released to the general public or to the advertisers relying on the filtering in order to pay for valid and the most effective internet advertising. That is, while a report may indicate the number of fraudulent click-throughs, the advertiser has no way to verify that the number reflects the actual number of fraudulent click-throughs. As a result, third party auditing services that monitor click-through rates have evolved to provide additional statistical data for purposes of verifying click-through reports provided to advertisers.

SUMMARY OF THE INVENTION

A method and system for providing the centralized collection of click-through traffic information. The method includes receiving at a first server a first request for content from a requesting computing resource. The first request is associated with a first uniform resource locator (URL). Information is collected from a header of the first request. For instance, the information is related to click-through traffic. A URL redirect command is sent to the requesting computing resource so that the computing resource issues a second request for the content from a second URL. The second URL is associated and supported by a second server. The information is included in the domain name of the second URL in the URL redirect command to enable transfer of the information to a third party auditing server without establishing a connection between the third party auditing server and any web server providing the content. The third party auditing server supports domain name resolution for the second URL. Additionally, the method provides for receiving a domain name service (DNS) query for the domain name of the second URL at the third party auditing server from the requesting computing resource. The information is parsed from the DNS query, and more specifically, from the domain name included within the DNS query. An internet protocol (IP) address for the domain name is sent to the requesting computing resource.

The system for providing centralized collection of click-through traffic information includes a third party auditing service. More specifically, the third party auditing service supports domain name resolution as well as the collection of click-through traffic information. For instance, the third party auditing service supports domain name resolution for domain names configured to include subdomains comprising a delimiter separating a string of click-through information and a sub-level domain of a corresponding domain name. The third party auditing service is configured to parse the string of click-through information from the corresponding domain name when responding to a corresponding DNS query. The collection of click-through information is provided without establishing a connection between the third party auditing service and any web server providing content that is associated with the corresponding DNS query.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

DETAILED DESCRIPTION OF THE PREFERRED EMBODIMENTS

Figure 1:
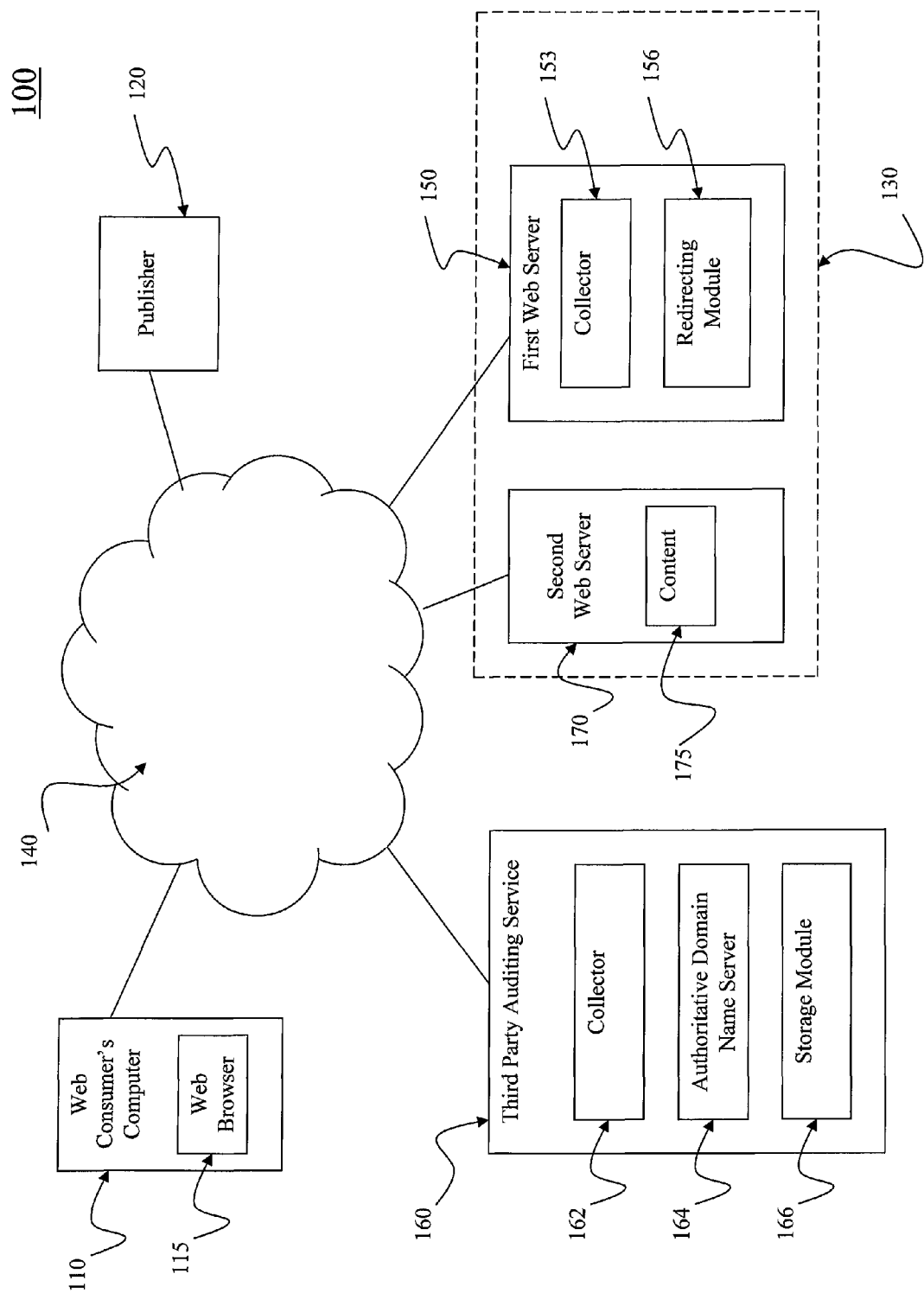
FIG. 1 is a diagram of a communication network that includes a system that is capable of supporting the centralized collection of click-through traffic information using an authoritative domain name server, in accordance with one embodiment of the present invention.

Reference will now be made in detail to the preferred embodiments of the present invention, a method and system for centralized collection of information related to click-through traffic using an authoritative domain name server. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention as defined by the appended claims.

Accordingly, embodiments of the present invention are capable of providing the centralized collection of real-time information regarding consumer click-through traffic across numerous, unrelated domain names. More specifically, the collection of the information related to click-through traffic is obtained without a connection being made between the third party auditing service collecting the information and any web server providing the requested content (e.g., an advertiser's web page). Once collected, such information could be used for a variety of purposes, including identification of suspect or fraudulent PPC traffic. The method is minimally invasive, as it does not interfere with domain branding, the setting of cookies, or traffic flowing to any given domain name.

Notation and Nomenclature

Embodiments of the present invention can be implemented on a software program for processing data through a computer system. The computer system can be a personal computer, notebook computer, server computer, mainframe, networked computer (e.g., router), handheld computer, personal digital assistant, workstation, and the like. This program or its corresponding hardware implementation is operable for providing centralized collection of click-through traffic information using an authoritative domain name service. In one embodiment, the computer system includes a processor coupled to a bus and memory storage coupled to the bus. The memory storage can be volatile or non-volatile and can include removable storage media. The computer can also include a display, provision for data input and output, etc.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "collecting," "parsing," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

Communication Network

Embodiments of the present invention are described within the context of a web-based system (e.g., internet) for providing centralized collection of information related to click-through traffic across numerous, unrelated domain names through the use of a DNS server. More particularly, the internet is a collection of communicatively coupled web servers and web browsers associated with a user's computing resource that allow for the transfer of content (e.g., advertisements, web pages, files, etc.) between web sites and various users. For instance, a web user can access content provided through a web server by requesting a uniform resource locator (URL). The URL provides an address within the internet for accessing a web server, and a file path within the web server that accesses the file providing the content. In one embodiment, as the content is accessed, click-through information is collected by a third party auditing service through the use of a DNS server without establishing a connection between the third party auditing service and any web server providing the content.

FIG. 1 is an illustration of a communication system 100 that is capable of providing the centralized collection of information related to click-through traffic across numerous, unrelated domain names, in accordance with one embodiment of the present invention. The communication system 100 is configured to enable communication between one or more users (hereinafter referred to as web consumers) that are coupled to a communication network 140 for purposes of presenting and viewing content. For example, in one embodiment, the communication network 140 is the internet, but could be any suitable network capable of supporting an online social networking sites or forums, hereinafter referred to as online forums.

As shown in FIG. 1, a computing resource (e.g., computer) 110 is associated with a web consumer. The web consumer via computer 110 is able to access the communication network 140 through the use of a web browser 115. That is, the web browser 115 is able to access content available from web servers that are coupled to the communication network 140 by requesting a URL that corresponds to the content.

In one particular example, the web consumer through computer 110 is able to access an advertiser's web page, as content, merely by clicking on a link that provides the URL of the advertiser's web page to the web browser 115. For instance, the link is provided in the form of a clickable advertisement that is provided from content viewable by the web consumer. As shown in FIG. 1, the clickable advertisement is provided by the publisher 120 of the advertisement. In one case, the web consumer is viewing a web page provided by the publisher 120, which includes a clickable advertisement. In another case, the web consumer is viewing an e-mail message that provides a clickable advertisement. In still another case, the web consumer is provided with a clickable advertisement through any available medium.

Figure 2:
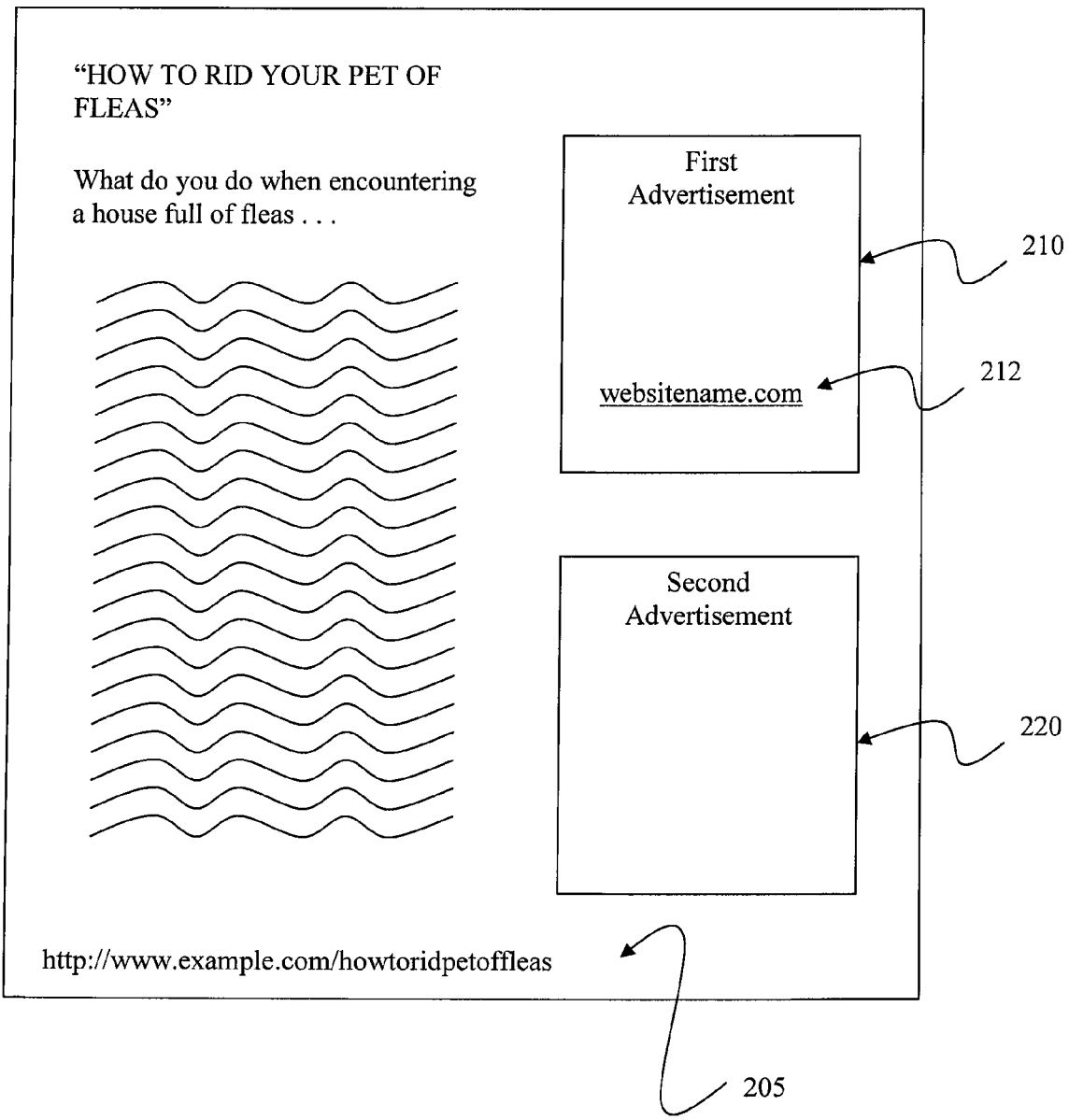
FIG. 2 is a diagram illustrating an exemplary web page as a publisher of clickable advertisements accessible by a web consumer, in accordance with one embodiment of the present invention.

FIG. 2 is a diagram illustrating an exemplary web page 200 that is accessible by a web consumer, such as through the web browser 115 of computer 110 in FIG. 1, in accordance with one embodiment of the present invention. A URL 205 is provided at the bottom of web page 200 that indicates how to access web page 200 through the internet. The domain name associated with the web server providing web page 200 is "example.com." As shown, the content included in web page 200 is a web article providing tips on care for a pet with fleas.

In association with the article, web page 200 also includes targeted advertisements 210 and 220. The owner of web page 200 is known as the publisher (e.g., publisher 120 of FIG. 1) of the advertisements. These advertisements are targeted to the web consumer by virtue of the fact that the consumer is researching articles on pet care. As such, companies that provide goods or services related to pets may want to advertise on the web page 200, since they know that users accessing the article on web page 200 are more likely to have pets. For example, advertisement 210 is provided by a pet store with a exemplary domain name "websitename.com." That is, the brand of the domain name is recognizable as providing goods and services related to pets and is generally represented by the term "websitename.com." In this case, the pet store associated with "websitename.com" is known as the advertiser.

The web consumer may access the web page associated with advertisement 210 through various means. For instance, web consumer may click on the clickable link 212. In another case, the web consumer may click anywhere on the advertisement 210. Other means are well supported for selecting advertisement 210, in other embodiments. In any case, when a click is recognized as click-through traffic, the web consumer is presented with the web page associated with the pet store advertiser (e.g., home page). In addition, once the click is registered, the advertiser is responsible for click-through fees (e.g., PPC payment) to a search engine maintaining the advertisement, the publisher of the advertisement (e.g., the owner of web page 200), a combination of both, etc.

Returning back to FIG. 1, content provider 130 provides the content associated with the clickable advertisement associated with publisher 120. That is, once the web consumer, through web browser 115 of computer 110, clicks on an advertisement, content provider 130 ultimately provides the content (e.g., home page of the advertiser) associated with the advertisement. For instance, using the example first described in FIG. 2, the content provider 130 could be the pet store associated with "websitename.com."

As shown in FIG. 1, content provider 130 includes a first web server 150 and a second web server 170, as well as any additional web servers needed to provide the content to the web consumer, as will be described more fully with respect to FIGS. 3 and 4. As an introduction, the first web server 150 includes a collector 153 that collects click-through information generated from the selection of a clickable advertisement through web browser 115. In addition, the first web server 150 includes a redirecting module 156 for purposes of redirecting the request for content to the second web server 170. Once the request is redirected, the second web server 170 provides the content 175 to the web browser 115 associated with the web consumer making the request for the content. In other embodiments, content provider 130 includes additional web servers that are needed to provide the content 175 to the web consumer, as will be described more fully below.

Also shown in FIG. 1, a third party auditing service 160 is coupled to communication network 140. The third party auditing service 160 is able to provide a central location for the collection of information related to click-through traffic for one or more advertisers providing clickable advertisements. Additionally, the third party auditing service 160 is able to collect information related to click-through traffic when supporting a domain name lookup when the web browser 115 is accessing the second web server 170.

More particularly, the third party auditing service 160 supports domain name resolution for domain names configured to include subdomains comprising a delimiter separating a string of click-through information and a sub-level domain of a corresponding domain name. The third party auditing service 160 is configured to parse the string of click-through information from the corresponding domain name when responding to a corresponding DNS query without establishing a connection between the third party auditing server and any web server providing content associated with the corresponding DNS query.

Figure 3:
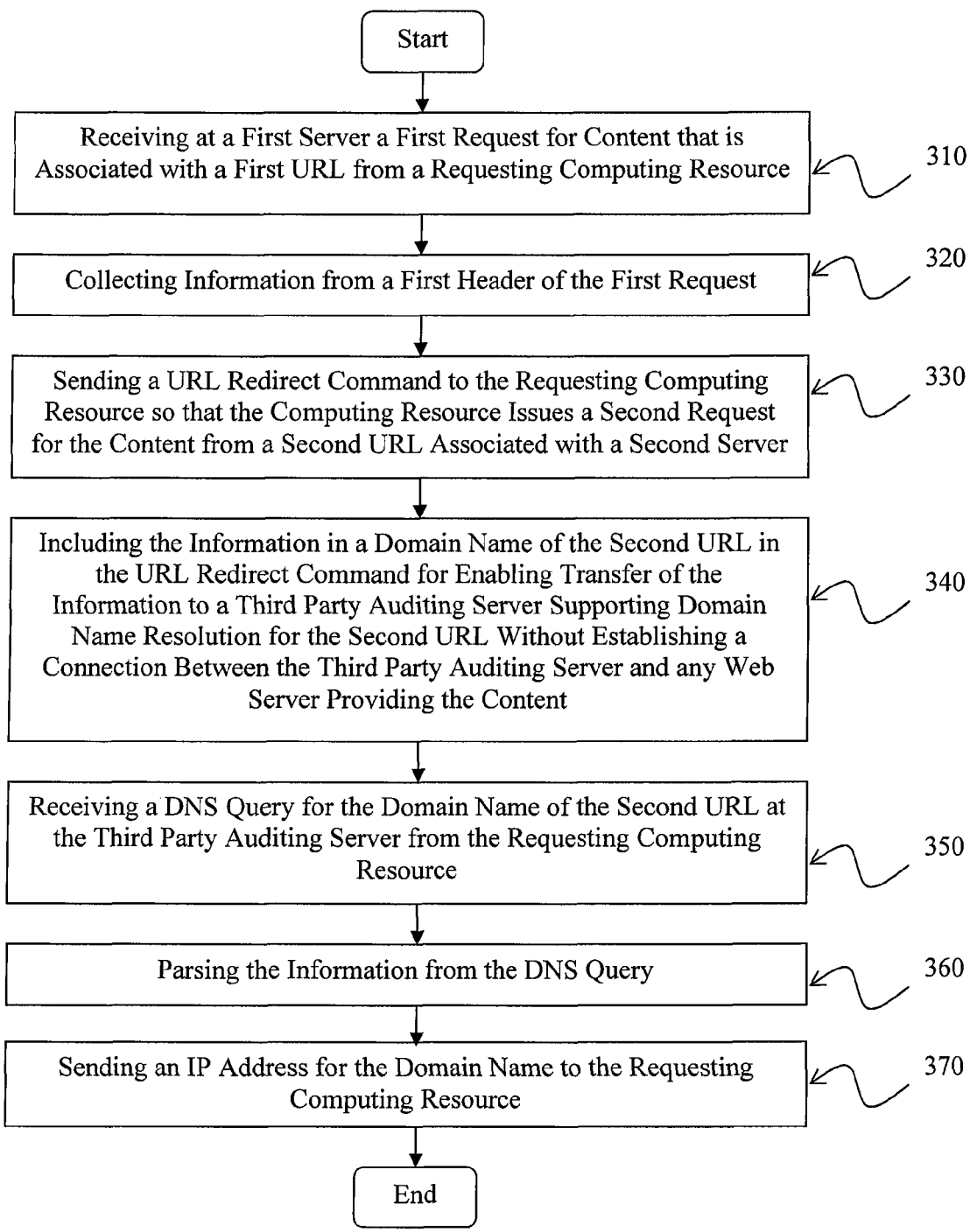
FIG. 3 is a data flow diagram illustrating a method of collecting click-through traffic information using an authoritative domain name server, in accordance with one embodiment of the present invention.
Figure 4:
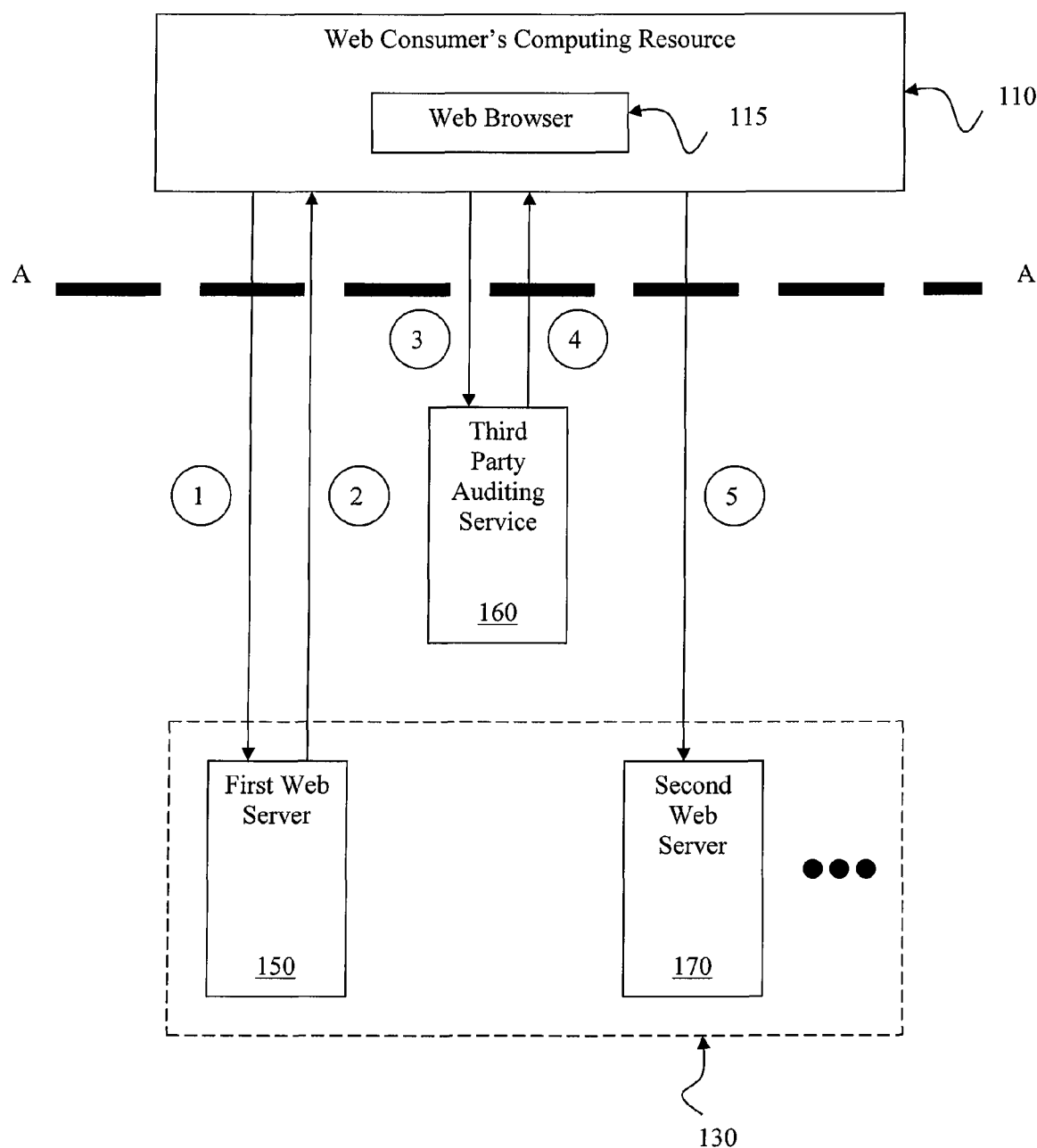
FIG. 4 is a flow diagram illustrating a method of collecting click-through traffic information using an authoritative domain name server, in accordance with one embodiment of the present invention.

In particular, the third party auditing service 160 includes a collector 162 that collects information related to click-through traffic without establishing a connection between the third party auditing service 160 and any web server providing the requested content, including those web servers associated with the content provider 130, as will be more fully described in relation to FIGS. 3 and 4. Also, the third party auditing service 160 includes a storage module 166 for storing the information related to click-through traffic. In addition, the third party auditing service 160 includes an authoritative domain name server 164 that is configured to support domain names that are associated with the content provider 130, and wherein the domain names are also configured in a format that includes corresponding information related to click-through traffic for a particular request for content, as will be further described in relation to FIGS. 3-4.

Central Collection of Consumer Click-Through Information

FIGS. 3 and 4 in combination illustrate the process for collecting information related to click-through traffic using a domain name server, in accordance with one embodiment of the present invention. In particular, FIG. 3 is flow diagram 300 illustrating a method for centralized collection of click-through traffic without establishing a connection between a third party auditing service and any web server providing content that is associated with corresponding click-through traffic. FIG. 4 is a data flow diagram 400 illustrating the flow of data in the method outlined in FIG. 3 for capturing click-through traffic using a DNS server.

Implementation of the features illustrated in the method outlined in FIGS. 3 and 4 is provided through the communication system 100 of FIG. 1, in one embodiment. As such, components that are similarly numbered in FIGS. 1 and 4 relate to the same component providing the same feature. As such, data flow diagram 400, as implemented through the communication system 100, provides for the collection of click-through traffic associated with the request for content coming from a web consumer's computer 110 via a web browser 115.

As shown in FIG. 4, components located below line A-A are included within a system for providing centralized collection of information related to click-through traffic, in one embodiment. In other embodiments, the system includes one or more of the components located below line A-A. For instance, in one case, the system includes the content provider 130 and the third party auditing service 160 working together to provide collection of click-through traffic information. In other embodiments, the system includes the third party auditing service 160 that is able to collect information related to click-through traffic when a web consumer is accessing content provided by the content provider 130.

Turning now to FIG. 3, a method for collecting information related to click-through traffic is described in flow diagram 300. At 310, a first request for content is received at a first server from a requesting computing resource. The content is associated with a first URL that is provided by a content provider.

As a representative example, the process outlined at 310 is shown in operation 1 of flow diagram 400. More specifically, the advertiser, or owner of the web site with the proper domain name "websitename.com" places advertising in a web site, an e-mail, or any suitable advertising medium. The advertising is selectable through a click on the advertisement itself, or on a link, for example. A web consumer, through computing resource 110 and web browser 115 accesses the web site, and clicks on the advertising. As a result, through the clickable linking mechanism (e.g., hyperlink) provided by the advertising, the web browser is directed to the URL associated with "websitename.com" for access to the requested content. To the web consumer, the brand (e.g., "websitename.com") of the domain name is recognizable and is included within the requested URL. For instance, the first URL is of the following format:

http://www.websitename.com/PATH0?GET0.

As shown, the first URL shown above includes a fully qualified domain name, "www.websitename.com," of which the shortened and proper domain name is "websitename.com." The domain name is associated with the web server of the web site providing content. In addition, the term "PATH0?GET0" in the first URL outlines the file path utilized by the corresponding web server to access the content. As such, the request for content is directed to the file containing the content that is addressable through the first URL. In essence, to the web consumer, upon selecting and activating the linking mechanism on the advertising, the web consumer is accessing the requested content.

At this stage, the web browser 115 or resolving engine associated with web browser 115 may issue a DNS query to discover the IP address of the domain name associated with the first URL, wherein the domain name is "websitename.com." The DNS query is issued to one or more distributed domain name servers that support the resolving of domain names throughout the internet. If one DNS server is unable to support the resolving of the domain name, that DNS server is capable of providing the address of another DNS server that is closer to resolving the domain name. Eventually, one of at least one appropriate DNS server is accessed and the proper IP address associated with the domain name is accessed. That is, one or more DNS servers may support resolving of the IP address that is associated with the domain name. The IP address is then returned to the web browser 115 from the authoritative DNS server, and is used to establish a session between the web browser 115 and the web site for transfer of content. As such, the web browser 115 is able to establish a communication session, using the hypertext transfer protocol (HTTP), with the first server 150, whereupon the first request for content is sent to the first server 150. HTTP is a communication protocol used for transferring information across the communication network 140 (e.g., internet) that establishes a communication session between a web browser 115 (user agent) and a web site (e.g., web server). The first request and any other request for content can be referred to as an HTTP request, or a URL request for purposes of this Application.

At 320, information from the header of the first request is captured or collected by the first server 150. More specifically, click-through information related to the request for content from the first URL is collected. For instance, as a representative example, collector 153 of the first web server is capable of collecting and assembling attributes that are present in the first HTTP or URL request. The collection and assembling functions may be implemented through a program running on the first server 150. These attributes are associated with information related to click-through traffic pertaining to the request for content.

In one embodiment, the collected information is encoded into an alphanumeric string. Data pieces of the resulting string of information is separated by delimiters. As a result, the combined data string of information and delimiters provide the click-through traffic corresponding to the original request for content.

In one embodiment, the combined data string of information is hashed for security purposes. For instance, a secret key (e.g., a string of text) may be used for purposes of hashing the combined string of information. The cryptographic hashing function (e.g., MD5, SHA1, etc.) is performed on the concatenation of the secret key and the combined data string to obtain a hash value. In one embodiment, an "INFO" string is created that includes the combined data string appended to the computed hash value. This "INFO" string is used as the string of information related to the click-through traffic that now has been hashed.

The attributes include the following standard HTTP header attributes, in one embodiment:

Consumer Useragent String: "USER_AGENT";
Customer Remote IP Address: "REMOTE_ADDR";
Customer Proxy IP Address: "X_FORWARDED_FOR"; and
URL of Referring Page: "HTTP_REFERRER."

More particularly, collected information identifies the web consumer and more particularly, the web browser on the consumer's computer. In addition, the customer information identifies the advertiser. Also, the referring page information identifies the publishing web site, or the web site that contains the clickable advertising. In one specific case, the URL of the referring page may be shortened for convenience. For example, the shortened version is limited to the domain name of the referring page, as opposed to the fully qualified domain name version.

In addition, other collected information includes attributes relating to the transmission control protocol/internet protocol (TCP/IP) stack implementation that is based upon the TCP/IP connection that supports the communication (e.g., HTTP) session. For instance, the stack implementation may include routing information through the communication network 140 of FIG. 1.

Also, other collected information relating to click-through traffic provides the specific target IP address, as discovered above. That is, the target IP address is the address of the first web server 150 to which the first URL is directed.

In addition, collected information includes a client identifier, such as a "client ID." That is, a number assigned to the advertising client is assigned by the third party auditing service 160 and is collected as click-through information.

Further, collected information includes an advertising campaign identifier, such as a "campaign ID." For instance, a number that is assigned to a particular advertising campaign is collected as click-through information. In one embodiment, the campaign identifier is included in the variables defining the file path "PATH0?GET0."

At 330, a URL redirect command is sent to the requesting computing resource. In that manner, upon receipt of the URL redirect, the computing resource issues a second request for the content from a second URL that is associated with a second server. More specifically, for purposes of the present invention, the first URL serves as a virtual or proxy web address for accessing the requested content. That is, the content is not necessarily provided at the first URL, but at an associated URL (e.g., the second URL) through a redirect command. As a result, through the redirect command, information related to the click-through traffic in association with the first request for content can be collected, as will be described below in relation to 340.

As a representative example, the process outlined in 330 is shown in operation 2 of flow diagram 400. More specifically, the redirecting module 156 of the first web server 150 is capable of issuing a redirect command to the web consumer's computing resource 110. That is, instead of providing access to the content at the first URL, the content is provided at another URL through a redirect command. In one embodiment, the content is provided through one or more redirect commands for purposes of collecting information related to click-through traffic associated with the original request. As a result, the computing resource 110 through its web browser 115 is instructed to issue a second HTTP request for the content from a second URL.

Various means are supported for redirecting the HTTP request, in embodiments of the present invention. For instance, in one embodiment, the redirect is accomplished through a 301 redirect. In another embodiment, the redirect is accomplished through an "HTTP 302" location header redirect. In still other embodiments, the redirect is accomplished through a meta refresh command, or a page replacement command that is executed by a scripting language such as JavaScript.

At 340, the information relating to the click-through traffic associated with the original request for content is included in the domain name of the second URL in the URL redirect command. As a representative example, as a continuation of operation 2 of data flow 400, the redirecting module 156 is capable of including the information in the domain name of the second URL.

Specifically, the domain name of the second URL includes the combined data string of information, previously described. For purposes of this example, the combined data string is represented by the term "INFO," which may or may not comprise a hashed value. Inclusion of "INFO" within the domain name of the second URL enables the transfer of the information related to click-through traffic to a third party auditing server 160 supporting domain name resolution for the second URL without establishing a connection between the third party auditing server 160 and any web server (e.g., server 150 or 170) ultimately providing the requested content. For instance, using the example provided above, the second URL is of the following format:

http://INFO.k.websitename.com/PATH1?GET1.

As shown, the second URL shown above includes a fully qualified domain name, "INFO.k.websitename.com." In one embodiment, the combined data string ("INFO") is a subdomain of the domain name associated with the second URL. In one specific embodiment, the domain name associated with the second URL is configured to include a delimiter separating a string of click-through information and a sub-level domain (e.g., websitename) of the domain name corresponding to the second URL. In one embodiment, the sub-level domain is the first level domain name (e.g., "websitename.com).

Specifically, as shown above, the domain name of the second URL is configured as "*.k.websitename," in one embodiment. As such, the "*" term comprises the combined data string of information related to click-through traffic for any request for the content from any web consumer. In addition, the term, "k," comprises a delimiter that separates the click-through information from the proper domain name (e.g., "websitename") associated with both the first and second URLs. As described above, in one embodiment, the proper domain name comprises a first level domain name (e.g., "websitename.com").

It is important to note that the domain name for the second URL includes the proper domain, "websitename.com," found in the first URL, so that there is an association with the original domain name associated with the first request for content. In addition, the term "PATH1?GET1" in the second URL outlines the file path utilized by the second web server 170 to access the content 175 that is addressable through the second URL.

In one embodiment, the inclusion of the information related to the click-through traffic in the domain name is accomplished without storing the information at the first web server 150. Storage is unnecessary for purposes of centralized collection of information, since the first web server 150 is able to capture the information and include that information in the domain name of the second URL in a redirect command. This provides an added benefit over historical auditing services, which required the collection of the information related to click-through traffic at the web server providing access to the content, the storage of the information at the web server, and the later transfer of the information in a query log, that includes other click-through traffic, to the auditing service. The communication of the query log introduces a latency in the receipt of the information. In distinction, embodiments of the present invention provide for the real-time collection of the information related to click-through traffic, as each request for content is processed.

In one embodiment, the second server 170 comprises the first server 150. That is, the same server supports both the first and second URL requests. In this case, the IP address for both servers may be identical; however, the state of the process is known by the domain names or the file path. As such, when the web server receives a URL request, it understands the current state in the process flow 400 for the collection of information.

Specifically, in the first case, the domain name of the second URL will include the additional information related to click-through traffic, thereby distinguishing it from the first URL, which only includes the proper domain name, "websitename.com." Also, in the second case, although representing access to the same content, the file paths are different from the first URL to the second URL. For instance, the first file path includes "PATH0?GET0," while the second file path includes "PATH1?GET1." As shown, the file paths also provide state information related to the process of data flow diagram 300 in the collection of information related to click-through traffic.

At 350, a DNS query for the domain name of the second URL is received at the third party auditing server, from the requesting computing resource. As a representative example, the process outlined at 350 is shown in operation 3 of flow diagram 400. More specifically, the third party auditing service 160 receives the DNS query from the web browser 115, as part of the domain name resolution process. In general, throughout the internet, each domain or subdomain is associated with at least one authoritative DNS server that provides IP addresses to the web server, or web site, servicing the corresponding URL.

The DNS query is issued to one or more distributed domain name servers that support the resolving of domain names throughout the internet. In particular, a process for resolving a domain name is followed, whereby DNS servers and their corresponding resolvers communicate between themselves to bring the DNS query to the proper set (e.g., one or more) of DNS servers that support the resolving of a corresponding domain name to an IP address. For instance, if one DNS server is unable to support the resolving of the domain name, that DNS server is capable of providing the address of another DNS server that is closer to resolving the domain name. Eventually, one of the set of appropriate DNS servers is accessed and the proper IP address associated with the domain name is accessed and returned to the originator of the DNS query, such as the resolver associated with the consumer's computing resource 110.

In one embodiment, one of a set of authoritative DNS servers that supports resolving of the proper domain name, "websitename.com" receives the DNS query. In the present embodiment, the each of the set of DNS servers is capable of recognizing that additional information is appended as sub-domains to the proper domain name. Specifically, "INFO.k" is appended to the front end of the proper domain name, "websitename.com." As such, upon this discovery of the additional information, the queried authoritative DNS server is able to sub-delegate processing of the DNS query to the third party auditing service 160. In that manner, the third party auditing service 160 is able to collect information related to click-through traffic by handling the DNS query.

As such, in one embodiment, the third party auditing service 160 is configured as the DNS name server supporting the resolving of IP addresses for all domain names configured as "*.k.websitename." As previously described, the "*" term comprises the combined data string of information related to click-through traffic, and "k" is a delimiter separating the string from the proper domain name (e.g., "websitename"). In this manner, the third party auditing service 160 is used as the authoritative DNS server for every redirected request for content by any web consumer that is initiated through the clickable advertisement.

More specifically, the proper domain name comprises first and top level domains (e.g., "websitename.com") of the corresponding domain name associated with the second URL. In this manner, the third party auditing service receives all the domain name resolution requests for domain names of the form "*.k.websitename" (e.g., "INFO.k.websitename.com," "INFO.k.websitename.org," etc.). As such, any request for content originating through a clickable advertisement is redirected to the second URL including domain names of the above format, which requires a DNS query to resolve the second URL. In this manner, information related to click-through traffic for each of those requests is routed to the third party auditing service 160 for purposes of capture, and possibly analysis of the captured data. Each of the second URLs associated with a different redirected request is unique, since the information term related to click-through traffic of a corresponding request for content is highly unique. In this way, caching of IP addresses for URLs and a detour around the third party auditing service is avoided because of the uniqueness between each of the second URLs.

At 360, upon receiving the DNS query, the third party auditing service parses, captures, or extracts the information (e.g., "INFO") related to the click-through traffic included in the domain name of the redirected URL, or second URL, in the above example. As a representative example, the process outlined in 360 is shown as a continuation of operation 3 of data flow diagram 400.

After extraction, the information is stored in association with the third party auditing service 160 for later access. As an example, data that is stored can include the time of the DNS request, the combined data string of information related to click-through traffic, the domain name requested, the IP address of the consumer's computing device 110, etc. As a result, analysis can be performed on click-through information related to a particular content provider (advertiser) for purposes of discovering fraudulent click-through activity.

At 370, an IP address for the domain name requested in the DNS query is sent to the requesting computing resource. As a representative example, the process outlined in 370 is shown as operation 4 of data flow diagram 400. More specifically, the DNS server 164 of the third party auditing service 160 is capable of determining the proper IP address associated with the domain name included in the redirected URL request, or second URL request, and sending the IP address back to the web browser 115 of the requesting computing resource 110.

In another embodiment, if the information string (e.g., "INFO") related to click-through traffic is hashed, the third party auditing service 160 can verify the hash value contained in the "INFO" term. If the value is not correct, then the IP address is not returned, and the DNS query is ignored. On the other hand, if the value is correct, the DNS query is processed and the IP address is returned or sent back to the web browser 115.

Upon completion of a valid DNS query, the web browser 115 now has a valid IP address for the domain name associated with the redirected or second URL (e.g., "INFO.k.websitename.com"). As a result, a second HTTP request or URL request is made to the web server providing the requested content. As a representative example, the accessing of the content is outlined in operation 5 of data flow diagram 400. More specifically, the web browser 115 sends a second request for the content that is accessed through the second URL supported by the second server 170.

In still another embodiment, after receipt of the second HTTP request for the second URL, the second web server 170 issues a second URL redirect command to the requesting computing resource 110. The second redirect is enabled for purposes of providing content in a manner that is recognizable by the web consumer. For instance, the second URL redirect command includes a domain name for a third URL that is stripped of the information related to click-through traffic. The third URL is associated with a third server. The information is no longer needed, since it has been captured and stored at the third party auditing service 160. In this manner, the domain name for the third URL reflects closely the original domain name from the original or first HTTP request. However, the file path is different for purposes of differentiating state within the process of collecting informa tion related to click-through traffic as outlined in FIGS. 3 and 4. For instance, the third URL is of the following format:
http://www.websitename.com/PATH2?GET2.

In embodiments of the present invention, the third party auditing service is able to support a plurality of domain names associated with a plurality of clickable advertisements for purposes of collecting information related to click-through traffic for each of the corresponding advertisers. As such, a centralized source is disclosed that is capable of providing the collection of real-time information regarding consumer click-through traffic across numerous, unrelated domain names. More specifically, the collection of the click-through traffic is obtained without a connection being made between the third party auditing service collecting the information and any web server providing corresponding content that is requested from any of multiple advertisers supported.

In another embodiment, a method for providing the centralized collection of click-through traffic information is performed. The method includes receiving a DNS query for a domain name at a third party auditing service from a requesting computing resource. The domain name is configured to include click-through information as a subdomain, and wherein a URL associated with the domain name provides content. The click-through information is parsed from the domain name without establishing a connection between said third party auditing server and any web server providing the content. In addition, an IP address for the web server associated with the domain name is sent to the requesting computing resource.

While the methods of embodiments illustrated in flow chart 3 show specific sequences and quantity of operations, the present invention is suitable to alternative embodiments. For example, not all the operations provided for in the methods presented above are required for the present invention. Furthermore, additional operations can be added to the operations presented in the present embodiments. Likewise the sequences of operations can be modified depending upon the application.

A method and system for centralized collection of click-through traffic information using an authoritative domain name service is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed:

1. A method for collection, comprising:
receiving at a first server a first request for content that is associated with a first URL from a requesting computing resource;
collecting click-through information from a first header of said first request, the click-through information comprising information related to the first request;
sending a URL redirect command comprising a second URL associated with a second server to said requesting computing resource causing said computing resource to issue a second request for said content from the second URL;
including said click-through information in a domain name of said second URL in said URL redirect command enabling transfer of said click-through information to a third party auditing server supporting domain name resolution for said second URL without establishing a connection between said third party auditing server and any server providing said content;
receiving a DNS query for said domain name of said second URL at said third party auditing server from said requesting computing resource, wherein said domain name includes subdomains comprising a delimiter separating a string of the click-through information and a sub-level domain of a corresponding domain name;
parsing said click-through information from said domain name of said second URL at said third party auditing server; and
responding to the DNS query by sending an IP address for said domain name of said second URL from said third party auditing server to said requesting computing resource without establishing a connection between the third party auditing server and any server providing the content.

2. The method of claim 1, further comprising:
receiving at said second server said second request for said second URL for delivery of said content to said requesting computing resource.

3. The method of claim 1, wherein said including said click-through information further comprises:
configuring said domain name of said second URL such that said click-through information defines a subdomain of said domain name.

4. The method of claim 1, where said including said click-through information further comprises:
enabling transfer of said click-through information without establishing a connection between said third party auditing server and said first server or said second server.

5. The method of claim 1, further comprising:
configuring said third party auditing server as an authoritative name server for domain names configured to include subdomains comprising a delimiter separating a string of click-through information and a sub-level domain of a corresponding domain name.

6. The method of claim 5, further comprising:
configuring said third party auditing server as said authoritative name server for said domain names configured as "*.k.websitename," wherein "*", comprises said string of click-through information, "k" comprises said delimiter, and "websitename" comprises said sub-level domain comprising a first-level domain of said corresponding domain name.

7. The method of claim 1, wherein said second server comprises said first server.

8. The method of claim 1, further comprising:
storing said click-through information at the third party auditing server.

9. The method of claim 7, wherein said click-through information comprises at least one of a group consisting of the following:
consumer agent string;
customer remote IP address;
customer proxy IP address;
URL of referring page; and
a condensed version of said URL of said referring page.

10. The method of claim 7, wherein said click-through information comprises at least one of a group consisting of the following:
TCP/IP stack information;
target IP address;
client identification;
campaign identification.

11. The method of claim 1, further comprising:
sending a second URL redirect command to said requesting computing resource so that said computing resource issues a third request for said content from a third URL associated with a third server, wherein the domain name of said third URL is stripped of said click-through information.

12. A method for collecting click-through information, comprising:
receiving a DNS query for a domain name at a third party auditing server from a requesting computing resource, wherein said domain name is configured to include click-through information as a sub domain, and wherein a URL associated with said domain name provides content, and wherein the DNS query is responsive to:
the requesting computing resource sending to a first server a first request for content that is associated with a first URL,
the first server collecting click-through information from a first header of the first request, the click-through information comprising information related to the first request,
the first server sending a URL redirect command comprising a second URL associated with a second server to the requesting computing resource, causing the computing resource to issue a second request for the content from the second URL, and
the first server including the click-through information in a domain name of the second URL in the URL redirect command enabling transfer of the click-through information to a third party auditing server supporting domain name resolution for the second URL without establishing a connection between the third party auditing server and any server providing the content,
wherein the domain name in the DNS query includes subdomains comprising a delimiter separating a string of the click-through information and a sub-level domain of a corresponding domain name;
parsing the click-through information from the domain name of the second URL at the third party auditing server; and
responding to the DNS query by sending an IP address for the domain name of the second URL from the third party auditing server to the requesting computing resource without establishing a connection between the third party auditing server and any server providing the content.

13. The method of claim 12, wherein said receiving a DNS query further comprises:
receiving said DNS query, wherein said domain name is associated with a redirected request for a second URL providing content and is configured to include click-through information from a header associated with an original request for a first URL providing said content that is redirected.

14. The method of claim 12, further comprising:
configuring said third party auditing server as an authoritative name server for domain names configured to include subdomains comprising a delimiter separating a string of click-through information and a sub-level domain of said domain name.

15. The method of claim 12, further comprising:
configuring said third party auditing server as an authoritative name server for domain names configured as "*.k.websitename," wherein "*", includes said click-through information configured in a string, "k" comprises a delimiter, and "websitename" comprises a sub-level domain of said domain name.

16. The method of claim 12, further comprising:
storing said click-through information from said domain name.

17. The method of claim 12, further comprising:
receiving an original request for a first URL providing said content from said requesting computing resource;
collecting said click-through information from a header of said original request;
sending a URL redirect command to said requesting computing resource so that said computing resource issues a redirected request for said URL that is associated with said domain name providing said content; and
including said click-through information in said domain name of said URL in said URL redirect command for enabling transfer of said click-through information to said third party auditing server supporting domain name resolution for said URL without establishing a connection between said auditing server and any server providing said content.

18. A system for collection, comprising:
a first server configured to:
receive a first request for content that is associated with a first URL from a requesting computing resource,
collect click-through information from a first header of the first request, the click-through information comprising information related to the first request,
send a URL redirect command comprising a second URL associated with a second server to the requesting computing resource causing the computing resource to issue a second request for the content from the second URL, and
include the click-through information in a domain name of the second URL in the URL redirect command enabling transfer of the click-through information to a third party auditing server supporting domain name resolution for the second URL without establishing a connection between the third party auditing server and any server providing the content;
a third party auditing service supporting domain name resolution for domain names configured to:
receive a DNS query for the domain name of the second URL from the requesting computing resource, wherein the domain name includes subdomains comprising a delimiter separating a string of click-through information and a sub-level domain of a corresponding domain name,
parse said string of click-through information from said corresponding domain name, and
respond to a corresponding DNS query by sending an IP address for the domain name of the second URL without establishing a connection between said third party auditing server and any server providing content associated with said corresponding DNS query.

19. The system of claim 18, further comprising:
a second server configured to receive said second request for delivery of said content to said requesting computing resource.

20. A method for collection, comprising:
receiving at a first server a first request for content that is associated with a first URL from a requesting computing resource;
collecting click-through information from a first header of said first request, the click-through information comprising information related to the first request;

sending a URL redirect command comprising a second URL associated with a second server to said requesting computing resource causing said computing resource to issue a second request for said content from the second URL; and including said click-through information in a domain name of said second URL in said URL redirect command enabling transfer of said click-through information to a third party auditing server supporting domain name resolution for said second URL without establishing a connection between said third party auditing server and any server providing said content;

wherein the third party auditing server is configured to:
receive a DNS query for said domain name of said second URL at said auditing server from said requesting computing resource, wherein said domain name includes subdomains comprising a delimiter separating a string of the click-through information and a sub-level domain of a corresponding domain name,
parse said click-through information from said domain name of said second URL at said auditing server, and
respond to the DNS query by sending an IP address for said domain name of said second URL from said auditing server to said requesting computing resource without establishing a connection between the auditing server and any server providing the content.

21. The method of claim 20, further comprising:
receiving at said second server said second request for said second URL for delivery of said content to said requesting computing resource.

22. The method of claim 20, wherein said including said click-through information further comprises:
configuring said domain name of said second URL such that said click-through information defines a subdomain of said domain name.

23. The method of claim 20, where said including said click-through information further comprises:
enabling transfer of said click-through information without establishing a connection between said auditing server and said first server or said second server.

24. The method of claim 20, wherein said second server comprises said first server.

25. The method of claim 20, wherein said click-through information comprises at least one of a group consisting of the following:
consumer agent string;
customer remote IP address;
customer proxy IP address;
URL of referring page; and
a condensed version of said URL of said referring page.

26. The method of claim 20, wherein said click-through information comprises at least one of a group consisting of the following:
TCP/IP stack information;
target IP address;
client identification;
campaign identification.

27. The method of claim 20, further comprising:
sending a second URL redirect command to said requesting computing resource so that said computing resource issues a third request for said content from a third URL associated with a third server, wherein a domain name of said third URL is stripped of said click-through information.

* * * * *